United States Patent
Kim et al.

(10) Patent No.: US 11,164,529 B2
(45) Date of Patent: Nov. 2, 2021

(54) POWER SUPPLY AND DISPLAY DEVICE INCLUDING THE SAME

(71) Applicant: LG Display Co., Ltd., Seoul (KR)

(72) Inventors: Nak-Yoon Kim, Seoul (KR); Ji-Su Kim, Gwangju (KR); Hong-Soon Kim, Siheung-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/886,566

(22) Filed: May 28, 2020

(65) Prior Publication Data

US 2021/0090506 A1  Mar. 25, 2021

(30) Foreign Application Priority Data

Sep. 23, 2019 (KR) .................. 10-2019-0116767

(51) Int. Cl.
*G09G 3/3275* (2016.01)

(52) U.S. Cl.
CPC ..... *G09G 3/3275* (2013.01); *G09G 2330/024* (2013.01)

(58) Field of Classification Search
CPC ............. G09G 1/005; G09G 2330/021; G09G 2330/024
See application file for complete search history.

(56) References Cited

U.S. PATENT DOCUMENTS

| | | | | |
|---|---|---|---|---|
| 8,772,967 B1* | 7/2014 | Ikriannikov | ............ | H02M 1/14 307/82 |
| 2011/0057724 A1* | 3/2011 | Pabon | .................. | H02M 7/219 327/581 |
| 2013/0057529 A1* | 3/2013 | Lee | .......................... | G09G 3/20 345/211 |
| 2013/0113773 A1* | 5/2013 | Lee | ..................... | H05B 45/3725 345/211 |
| 2015/0061540 A1* | 3/2015 | Park | ..................... | H02M 3/1588 315/294 |
| 2015/0154917 A1* | 6/2015 | Jung | ...................... | G09G 3/342 345/102 |
| 2015/0326115 A1* | 11/2015 | Chen | ...................... | H02M 3/156 345/212 |
| 2016/0014857 A1* | 1/2016 | Park | ........................ | H05B 45/60 315/294 |
| 2016/0125791 A1* | 5/2016 | Park | ..................... | G09G 3/3208 345/211 |
| 2017/0170726 A1* | 6/2017 | Lee | ...................... | G09G 3/2092 |

(Continued)

FOREIGN PATENT DOCUMENTS

| KR | 10-2004-0068014 A | 7/2004 |
|---|---|---|
| KR | 10-2012-0023248 A | 3/2012 |

(Continued)

*Primary Examiner* — Ibrahim A Khan

(74) *Attorney, Agent, or Firm* — Polsinelli PC

(57) ABSTRACT

A power supply includes a boost circuit having a first boost circuit configured to output a first driving voltage to be supplied to the display panel by stepping unit an input voltage and a second boost circuit configured to output a second driving voltage to be supplied to the display panel by stepping down the input voltage, and a correction circuit configured to output a correction signal based on a result obtained by sensing the input voltage, and controls output efficiency of the boost circuit based on the input voltage and current sensed from the display panel.

15 Claims, 11 Drawing Sheets

(56) References Cited

U.S. PATENT DOCUMENTS

| | | | | |
|---|---|---|---|---|
| 2017/0236488 | A1* | 8/2017 | Suzuki | H02M 3/158 |
| | | | | 345/212 |
| 2018/0212513 | A1* | 7/2018 | Park | G09G 3/2092 |
| 2020/0153344 | A1* | 5/2020 | Park | H02M 1/32 |
| 2020/0177077 | A1* | 6/2020 | Li | H02M 3/07 |

FOREIGN PATENT DOCUMENTS

| KR | 10-2012-0048154 A | 5/2012 |
|---|---|---|
| KR | 10-2013-0072473 A | 7/2013 |

* cited by examiner

POWER SUPPLY AND DISPLAY DEVICE INCLUDING THE SAME

CROSS-REFERENCE TO RELATED APPLICATION

This application claims the benefit of Korean Patent Application No. 10-2019-0116767, filed on Sep. 23, 2019, which is hereby incorporated by reference in its entirety.

BACKGROUND

Field of the Disclosure

The present disclosure relates to a power supply and a display device including the same.

Description of the Background

With the development of information technologies, markets of display devices that are connection media between a user and information have expanded. Thus, display devices such as an organic light emitting display (OLED), a quantum dot display (QDD), a liquid crystal display (LCD), and a plasma display panel (PDP) have been increasingly used.

Some of the aforementioned display devices, for example, the LCD or the OLED includes a display panel including a plurality of sub-pixels arranged in a matrix form, a driver for outputting a driving signal for driving the display panel, and a power supply for generating power to be supplied to the display panel or the driver. The driver includes a scan driver for supplying a scan signal (or a gate signal) to gate lines of the display panel, and a data driver for supplying a data signal to data lines of the display panel.

The aforementioned display device displays an image by enabling a selected sub-pixel to transmit light therethrough or to directly emit light when a driving signal, e.g., a scan signal and a data signal is supplied to sub-pixels formed on a display panel.

SUMMARY

To overcome the aforementioned problem, the present disclosure provides to overcome efficiency hump based on a circuit for automatically correcting output efficiency and may perform optimization to prevent a point for achieving maximum efficiency from being varied (lowered), and thus, consumption power may be lowered, and a display device may be driven for a long time.

To achieve these objects and other advantages and in accordance with the purpose of the disclosure, as embodied and broadly described herein, a display device includes a display panel configured to display an image, a driver configured to drive the display panel, and a power supply. The power supply may include a boost circuit having a first boost circuit configured to output a first driving voltage to be supplied to the display panel by stepping unit an input voltage and a second boost circuit configured to output a second driving voltage to be supplied to the display panel by stepping down the input voltage, and a correction circuit configured to output a correction signal based on a result obtained by sensing the input voltage, and may control output efficiency of the boost circuit based on the input voltage and current sensed from the display panel.

The power supply may increase current to be supplied to the display panel to a second period from a first period or may decrease the current to a third period from the first period in order to control output efficiency of the boost circuit.

The second boost circuit may include a transistor configured to control the second driving voltage, a switch transistor configured to control the current to be supplied to the display panel, a first inductor disposed between the transistor and a ground line, a second inductor disposed between the switch transistor and the ground line, and a phase controller configured to the switch transistor.

The phase controller may vary a turning-on/off time point of the switch transistor based on the correction signal and the current sensed from the display panel.

The correction circuit may output the correction signal based on a register value output from a data driver configured to drive the display panel or a timing controller configured to control the data driver or a register value that is originally contained in the power supply.

The correction circuit may include a first correction circuit configured to compare a sensing voltage value configured to sense the input voltage with an internal reference voltage value and to output a result value, and a second correction circuit configured to output the correction signal based on the result value output from the first correction circuit and a register value supplied from an outside or an inside.

The first correction circuit may include a first resistor having a first end connected to an input end to which the input voltage is applied, a first comparison resistor having a first end connected to a second end of the first resistor and a second end connected to the ground line, and a first comparator having a first input end connected to a connection of the first resistor and the first comparison resistor, a second input end connected to a reference voltage line, and an output end connected to a first input end of the second correction circuit, and the second correction circuit may include a second resistor having a first end connected to the input end, a second comparison resistor having a first end connected to a second end of the second resistor and a second end connected to the ground line, and a second comparator having a first input end connected to a connection node of the second resistor and the second comparison resistor, a second input end connected to the reference voltage line, and an output end connected to a second input end of the second correction circuit.

In another aspect of the present disclosure, a power supply includes a boost circuit and a correction circuit. The boost circuit may include a first boost circuit configured to output a first driving voltage with a high potential by stepping up an input voltage, and a second boost circuit configured to output a second driving voltage with a low potential by stepping down the input voltage. A correction circuit may output a correction signal based on a result obtained by sensing the input voltage. Output efficiency of the boost circuit may be automatically controlled based on the input voltage and current sensed from a load.

The second boost circuit may include a transistor configured to control the second driving voltage, a switch transistor configured to control the current to be supplied to the display panel, a first inductor disposed between the transistor and a ground line, a second inductor disposed between the switch transistor and the ground line, and a phase controller configured to control the switch transistor, and the phase controller may vary a turning-on/off time point of the switch transistor based on the correction signal and the current sensed from the display panel.

The correction circuit may include a first correction circuit including a first resistor having a first end connected to an input end to which the input voltage is applied, a first comparison resistor having a first end connected to a second end of the first resistor and a second end connected to the ground line, and a first comparator having a first input end connected to a connection of the first resistor and the first comparison resistor, a second input end connected to a reference voltage line, and an output end connected to a first input end of the second correction circuit, and a second correction circuit including a second resistor having a first end connected to the input end to which the input voltage is applied, a second comparison resistor having a first end connected to a second end of the second resistor and a second end connected to the ground line, and a second comparator having a first input end connected to a connection node of the second resistor and the second comparison resistor, a second input end connected to the reference voltage line, and an output end connected to a second input end of the second correction circuit.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

In the drawings.

DETAILED DESCRIPTION

Reference will now be made in detail to the exemplary aspects of the present disclosure, examples of which are illustrated in the accompanying drawings.

With the development of information technologies, markets of display devices that are connection media between a user and information have expanded. Thus, display devices such as a quantum dot display (QDD), a liquid crystal display (LCD), an organic electroluminescence display (OLED), and plasma display panel (PDP) have been increasingly used.

Some of the aforementioned display devices, for example, the LCD or the OLED include a display panel including a plurality of sub-pixels arranged in a matrix form, a driver for outputting a driving signal for driving the display panel, and a power supply for generating power to be supplied to the display panel or the driver. The driver includes a scan driver for supplying a scan signal (or a gate signal) to the display panel, and a data driver for supplying a data signal to the display panel.

The aforementioned display device displays an image by enabling a selected sub-pixel to transmit light therethrough or to directly emit light when a driving signal, e.g., a scan signal and a data signal is supplied to sub-pixels formed on a display panel. Hereinafter, an OLED will be described with regard to exemplary aspects of the disclosure. Needless to say, the present disclosure may also be applied to an inorganic light emitting diode based display device but not an organic light emitting diode.

Figure 1:
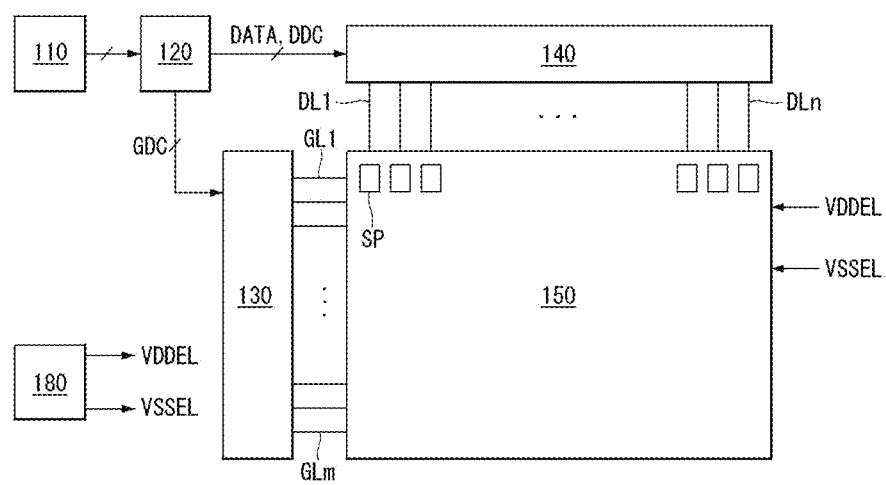
FIG. 1 is a schematic block diagram showing an organic electroluminescence display (OLED)
Figure 2:
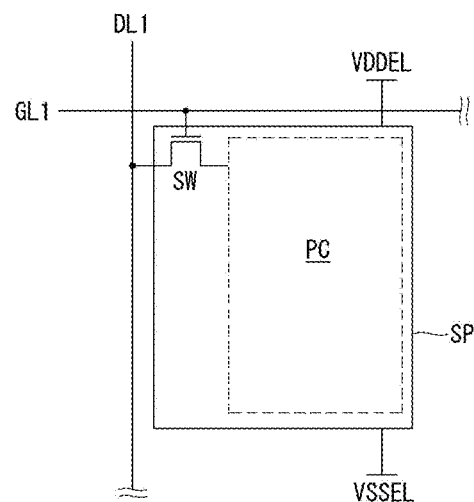
FIG. 2 is a schematic diagram showing a configuration of a sub-pixel shown in FIG. 1.

FIG. 1 is a schematic block diagram showing an OLED. FIG. 2 is a schematic diagram showing a configuration of a sub-pixel shown in FIG. 1.

As shown in FIGS. 1 and 2, the OLED may include an image supply 110, a timing controller 120, a scan driver 130, a data driver 140, a display panel 150, and a power supply 180.

The image supply 110 may output various driving signals with an image data signal supplied from the outside or an image data signal stored in an internal memory. The image supply 110 may supply a data signal and various driving signals to the timing controller 120.

The timing controller 120 may output a gate timing control signal GDC for controlling operation timing of the scan driver 130, a data timing control signal DDC for controlling operation timing of the data driver 140, and various synchronization signals (vertical synchronization signal Vsync and horizontal synchronization signal Hsync). The timing controller 120 may supply the data signal DATA (or a data voltage) supplied from the image supply 110 with the data timing control signal DDC to the data driver 140.

The scan driver 130 may output the scan signal (or a gate signal) in response to the gate timing control signal GDC or the like, which is supplied from the timing controller 120. The scan driver 130 may supply the scan signal to sub-pixels included in the display panel 150 through gate lines GL1 to GLm. The scan driver 130 may be formed in the form of an integrated circuit (IC) or may be directly formed on the display panel 150 in a gate in panel (GIP) method.

The data driver 140 may sample and latch a data signal DATA in response to the data timing control signal DDC or the like supplied from the timing controller 120, may convert the data signal DATA into a data voltage in the form of an analog signal corresponding to a gamma reference voltage, and may output the data voltage. The data driver 140 may supply the data voltage to sub-pixels included in the display panel 150 through data lines DL1 to DLn. The data driver 140 may be formed in the formed of an integrated circuit (IC) and may be installed on the display panel 150 or may be installed on a printed circuit board, but the present disclosure is not limited thereto.

The power supply 180 may generate and output a first driving voltage VDDEL with a high potential and a second driving voltage VSSEL with a low potential based on an external input voltage supplied from the outside. The power supply 180 may generate and output a voltage (e.g., a scan high voltage or a scan low voltage) required to drive the scan driver 130 or a voltage (a drain voltage or a half drain voltage) required to drive the data driver 140 as well as the first and second driving voltages VDDEL and VSSEL.

The display panel 150 may display an image in response to a scan signal output from the scan driver 130, a data voltage output from the data driver 140, and the first and second driving voltages VDDEL and VSSEL output from the power supply 180. The sub-pixels of the display panel 150 may directly emit light.

For example, one sub-pixel SP may include an organic light emitting diode OLED and a pixel circuit PC including a driving transistor, a storage capacitor, a switching transistor SW, and the like. The sub-pixel SP used in the OLED may directly emit light and may have a complicated circuit configuration compared with a liquid crystal display. In addition, a compensation circuit for compensating for degradation of a driving transistor for supplying driving current to an organic light emitting diode as well as the organic light emitting diode for emitting light may be complicated and diversified. Thus, it may be noted that the pixel circuit PC included in the sub-pixel SP is illustrated in the form of a block.

According to the present disclosure, the display panel 150 may be embodied as a plastic substrate or the like and may be instrumentally deformed by bending a specific region or rolling or unrolling a specific region in the form of a roll, and thus, may be applied to various products.

Figure 3:
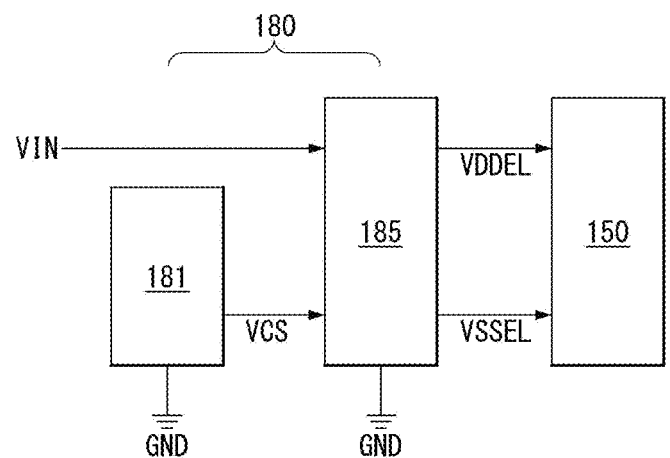
FIG. 3 is a schematic block diagram of a power supply according to a first aspect of the present disclosure.
Figure 4:
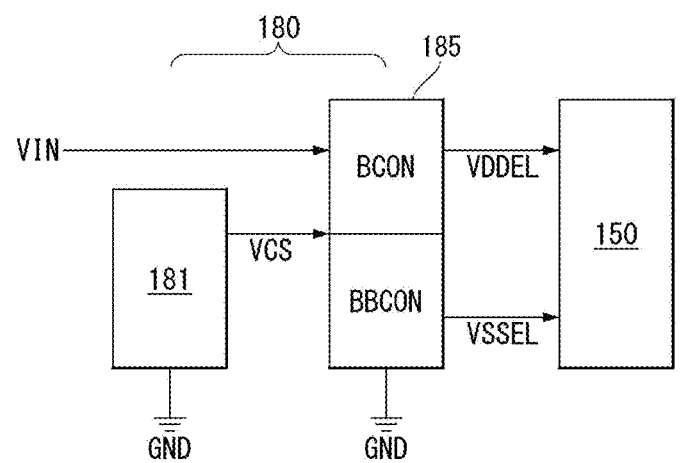
FIG. 4 is a schematic block diagram of a power supply according to a second aspect of the present disclosure.
Figure 5:
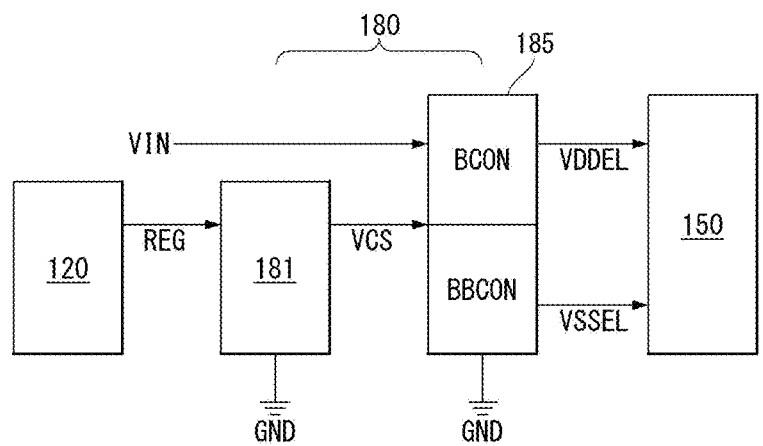
FIG. 5 is a schematic block diagram of a power supply according to a third aspect of the present disclosure.
Figure 6:
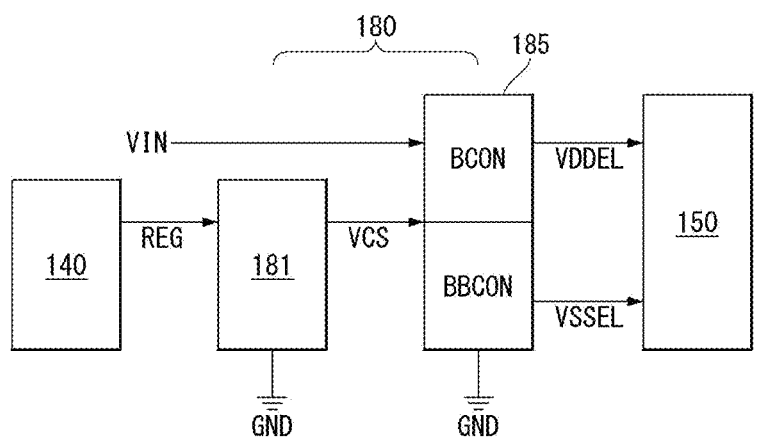
FIG. 6 is a schematic block diagram of a power supply according to a fourth aspect of the present disclosure.

FIG. 3 is a schematic block diagram of a power supply according to a first aspect of the present disclosure, FIG. 4 is a schematic block diagram of a power supply according to a second aspect of the present disclosure, FIG. 5 is a schematic block diagram of a power supply according to a third aspect of the present disclosure, and FIG. 6 is a schematic block diagram of a power supply according to a fourth aspect of the present disclosure.

As shown in FIG. 3, the power supply 180 according to the first aspect may include a correction circuit 181 and a boost circuit 185. The boost circuit 185 may generate and output the first driving voltage VDDEL with a high potential and the second driving voltage VSSEL with a low potential based on an input voltage VIN supplied from the outside. The boost circuit 185 may overcome an issue of reduction in output efficiency, which occurs when a voltage is generated based on a correction signal VCS output from the correction circuit 181.

As shown in FIG. 4, the power supply 180 according to the second aspect may include the correction circuit 181 and the boost circuit 185. The boost circuit 185 may include a first boost circuit BCON and a second boost circuit BBCON.

The first boost circuit BCON may be embodied as a boost converter for stepping up or outputting the input voltage VIN and the second boost circuit BBCON may be embodied as a buck-boost converter for stepping down or outputting the input voltage VIN.

The circuit such as the first boost circuit BCON and the second boost circuit BBCON included in the boost circuit 185 may have an output condition (an output state) that is varied based on the correction signal VCS output from the correction circuit 181.

The correction circuit 181 or the boost circuit 185 included in the power supply 180 may include a circuit for setting voltage or current applied to the display panel 150 (load) as well as the input voltage VIN. The correction circuit 181 may have a state (a control value, a logic value, or the like) of the correction signal VCS, which is varied based on a sensing result. That is, the power supply 180 itself may vary or control a voltage to be applied to the display panel 150.

As shown in FIG. 5, the power supply 180 according to the third aspect may include the correction circuit 181 and the boost circuit 185. The boost circuit 185 may include the first boost circuit BCON and the second boost circuit BBCON.

The correction circuit 181 may output the correction signal VCS based on a register value REG output from the timing controller 120. The correction circuit 181 may vary a state (a control value or a logic value) of the correction signal VCS based on the register value REG. That is, the power supply 180 may vary an output condition (an output state) under control of the timing controller 120.

As shown in FIG. 6, the power supply 180 according to the fourth aspect may include the correction circuit 181 and the boost circuit 185. The boost circuit 185 may include the first boost circuit BCON and the second boost circuit BBCON.

The correction circuit 181 may output the correction signal VCS based on the register value REG output from the data driver 140. The correction circuit 181 may vary a state (a control value or a logic value) of the correction signal VCS based on the register value REG. That is, the power supply 180 may vary an output condition (an output state) under control of the data driver 140.

In the following aspect, a configuration of a circuit of a power supply according to the present disclosure will be described in more detail using, as an example, a situation in which a battery voltage (which is one of the worst cases) in which the input voltage VIN is not continuously and constantly maintained.

Figure 7:
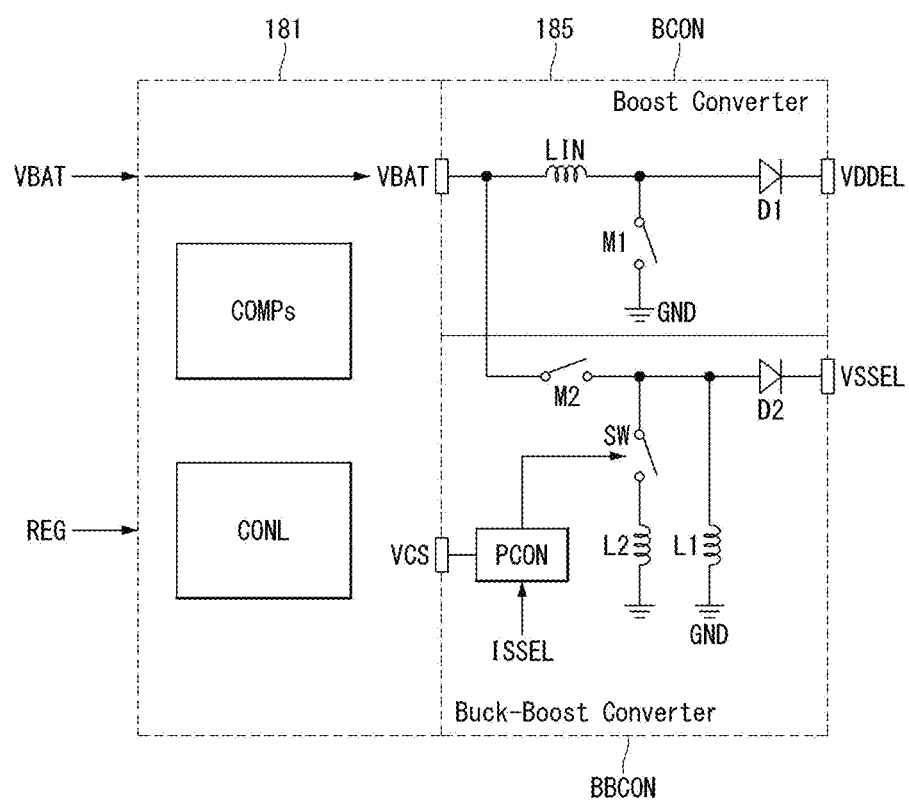
FIG. 7 is a detailed block diagram of a boost circuit of a power supply according to a fifth aspect of the present disclosure.

FIG. 7 is a detailed block diagram of a boost circuit of a power supply according to a fifth aspect of the present disclosure.

As shown in FIG. 7, the power supply 180 according to the fifth aspect may include the correction circuit 181 and the boost circuit 185. The correction circuit 181 may include a first correction circuit COMPs and a second correction circuit CONL, and the boost circuit 185 may include the first boost circuit BCON and the second boost circuit BBCON.

The first correction circuit COMPs may compare a sensing voltage value obtained by monitoring (sensing) a battery voltage with an internal reference voltage value and may then output a result value. To this end, the first correction circuit COMPs may include an active device and a passive device such as at least one comparator and at least one resistor.

The second correction circuit CONL may provide the correction signal VCS based on the result value output from the first correction circuit COMPs and the register value REG supplied from the outside. To this end, the second correction circuit CONL may include control logic such as a control circuit. The register value REG may be originally contained or may be received from a timing controller or a data driver.

The first boost circuit BCON may be embodied as a boost converter for stepping up and outputting a battery voltage, and the second boost circuit BBCON may be embodied as a buck boost converter for stepping down and outputting the input voltage VIN.

The first boost circuit BCON may be embodied as a boost converter for charging and discharging and stepping up current/voltage via a turn-on/off operation of a transistor, and thus, may include a boost inductor LIN, a first transistor M1, and a first output diode D1.

The boost inductor LIN may have one end connected to an input end VBAT to which a battery voltage is input, and the other end connected to an anode of the first output diode D1. The first transistor M1 may include a first electrode connected to the other end of the boost inductor LIN and a second electrode connected to a ground line GND, and although not shown, may include a gate electrode connected to a first control signal line. The first output diode D1 may include an anode connected to the other end of the boost inductor LIN and a first electrode of a boost switch M1, and a cathode connected to the first driving voltage output end VDDEL.

In addition, the first boost circuit BCON may further include an input capacitor of the input end VBAT and an output capacitor of the first driving voltage output end VDDEL.

The second boost circuit BBCON may be embodied as a 2 phase buck-boost converter for discharging and stepping down current/voltage using a turn-on/off operation of a switch transistor, and thus, may include a second transistor M2, a second output diode D2, a phase controller PCON, a switch transistor SW, a first inductor L1, and a second inductor L2.

The second transistor M2 may include a first electrode connected to the input end VBAT to which a battery voltage is input, and a second electrode connected to an anode of the second output diode D2, and although not shown, may include a gate connected to a second control signal line. The second output diode D2 may include an anode connected to the second electrode of the second transistor M2 and a cathode connected to the second driving voltage output end VSSEL.

The phase controller PCON may include a first input end connected to a correction signal input end VCS to which the correction signal VCS is input, a second input end connected to a current sensing line ISSEL for sensing current flowing through a second driving voltage line of the display panel, and an output end connected to a gate electrode of the switch transistor SW. The phase controller PCON may sense (refer to) second driving current of the display panel and may set a turn-on time of the switch transistor SW. The phase controller PCON may output a switch control signal for controlling turning-on/off the switch transistor SW based on the correction signal VCS and the sensing current.

The switch transistor SW may include a first electrode connected to the second electrode of the second transistor M2, a second electrode connected to one end of the second inductor L2, and a gate electrode connected to the output end of the phase controller PCON. The first inductor L1 may include one end connected to the second electrode of the second transistor M2 and the other end connected to the ground line GND. The second inductor L2 may include one end connected to the second electrode of the switch transistor SW and the other end connected to the ground line GND.

Like in the fifth aspect, when the 2 phase buck-boost converter is included in the power supply 180, an efficiency behavior of an output load may be changed depending on a battery voltage. In general, even if an efficiency behavior is changed, a time point of operating the second inductor L2 (or a time point of turning on the SW) is not changed, and thus, efficiency hump (hump; a phenomenon whereby efficiency is degraded while being bent like the back of a camel) may be caused.

However, according to the fifth aspect, the battery voltage may be sensed and current of the display panel may be sensed (in order to determine a load), and then, a time point of turning-on/off the switch transistor SW may be changed based on the sensing result. That is, according to the fifth aspect, efficiency hump may be overcome or prevented using a method of varying a time point of operating the second inductor L2 (changing an output load).

Figure 8:
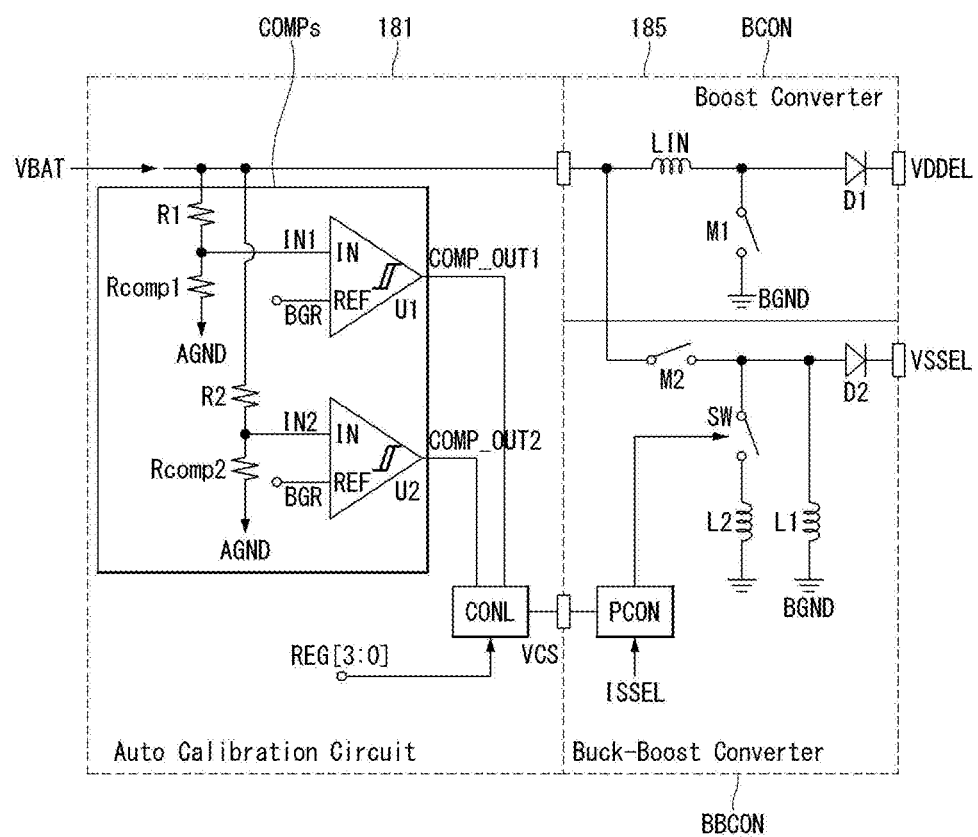
FIG. 8 is a more detailed block diagram of a correction circuit and a boost circuit of a power supply according to a sixth aspect of the present disclosure.
Figure 9:
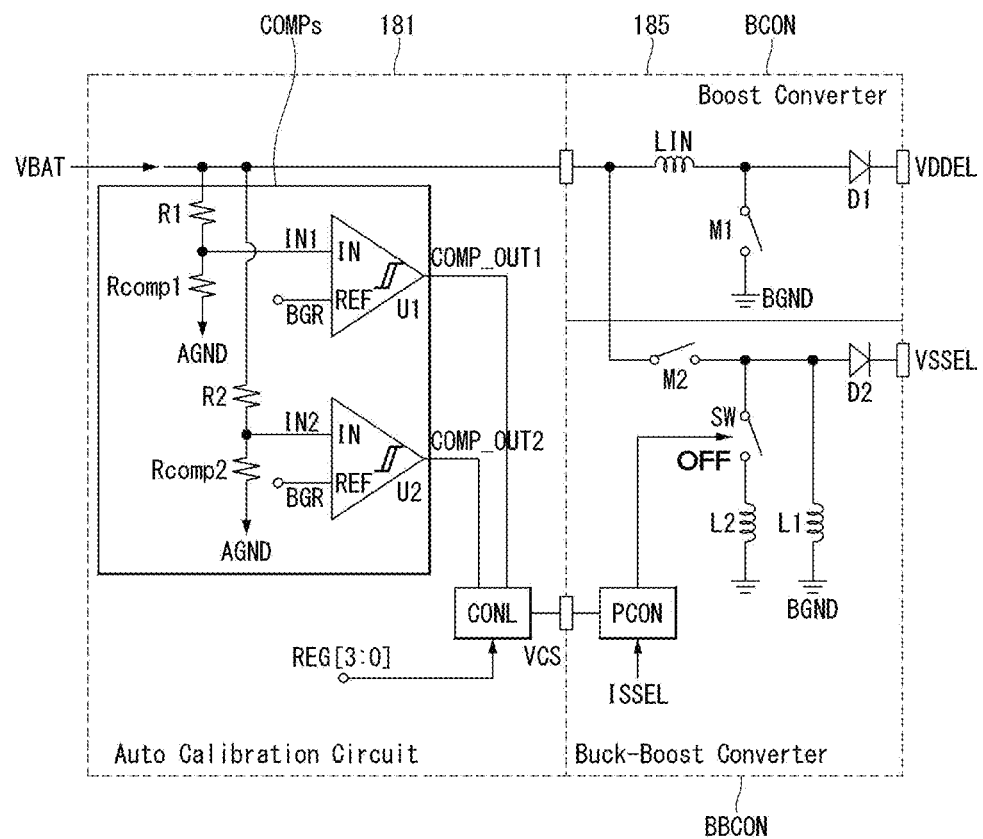
FIGS. 9 and 10 are block diagrams for explaining an operation of a power supply according to the sixth aspect of the present disclosure.
Figure 10:
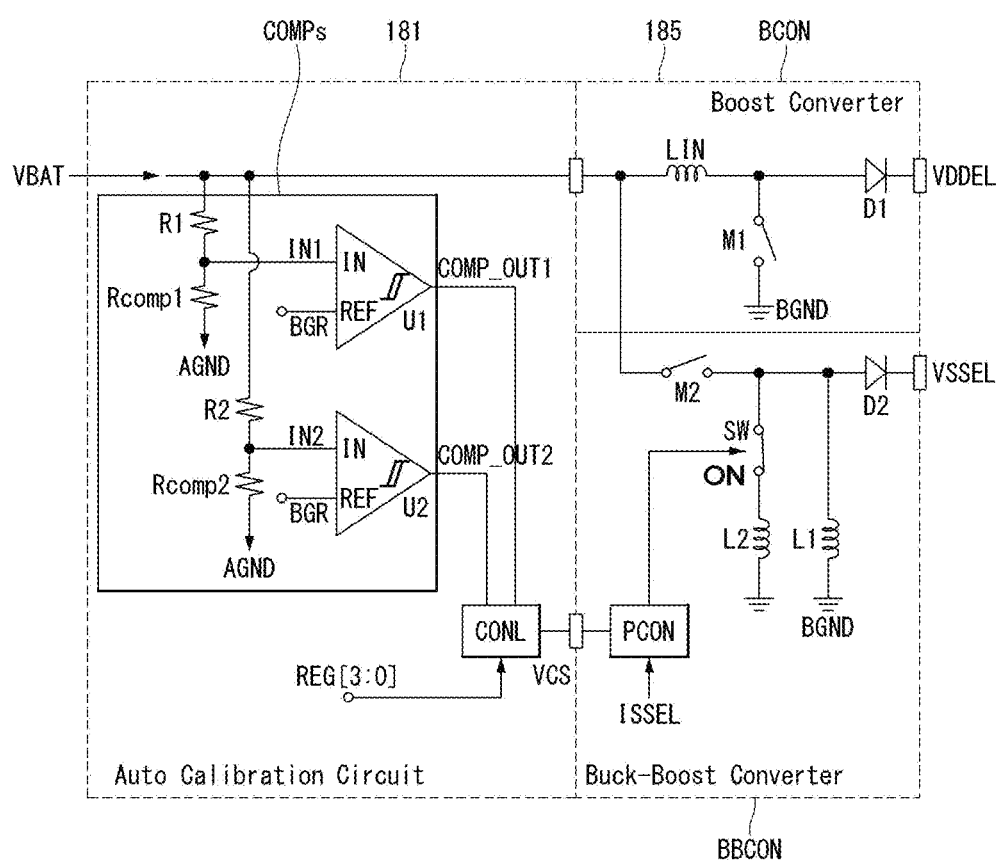
Figure 11:
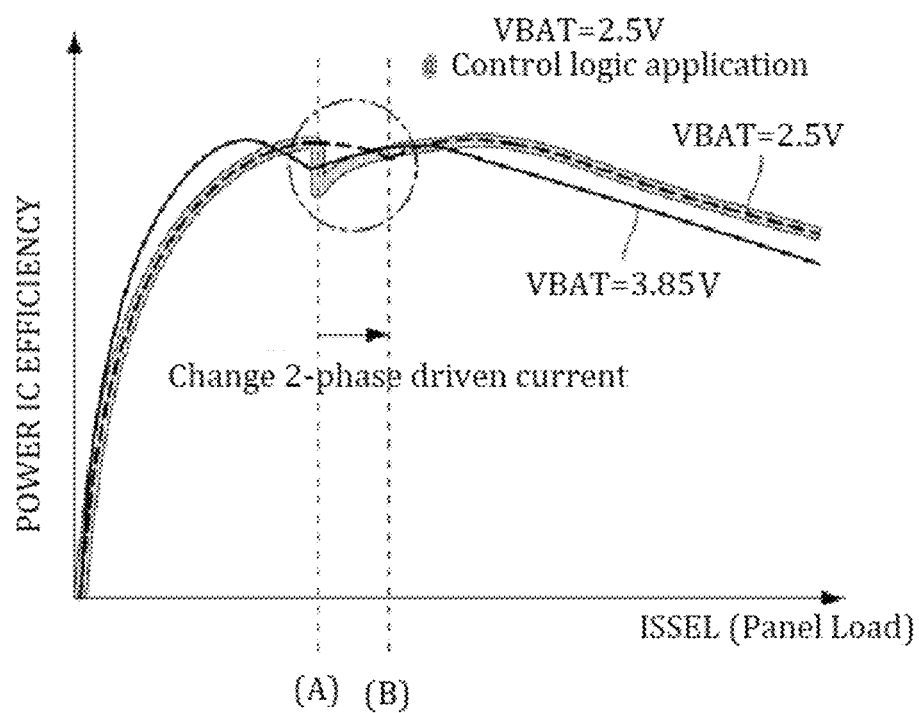
FIGS. 11 and 12 are diagrams showing a simulation result for explaining a degree by which output efficiency of the power supply according to the sixth aspect of the present disclosure is enhanced.
Figure 12:
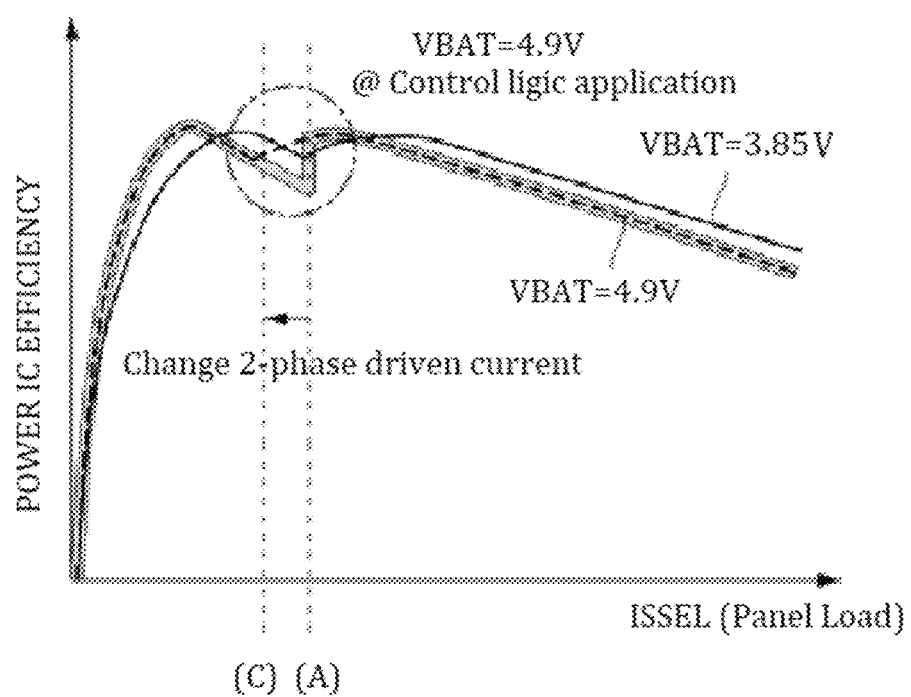

FIG. 8 is a more detailed block diagram of a correction circuit and a boost circuit of a power supply according to a sixth aspect of the present disclosure. FIGS. 9 and 10 are block diagrams for explaining an operation of a power supply according to the sixth aspect of the present disclosure. FIGS. 11 and 12 are diagrams showing a simulation result for explaining a degree by which output efficiency of the power supply according to the sixth aspect of the present disclosure is enhanced.

As shown in FIG. 8, the power supply 180 according to the sixth aspect may include the correction circuit 181 and the boost circuit 185. The correction circuit 181 may include the first correction circuit COMPs and the second correction circuit CONL, and the boost circuit 185 may include the first boost circuit BCON and the second boost circuit BBCON.

The first boost circuit BCON may be embodied as a boost converter for setting up and outputting a battery voltage, and the second boost circuit BBCON may be embodied as a buck-boost converter for stepping down and outputting the input voltage VIN.

The first boost circuit BCON may be embodied as a boost converter for charging and discharging and stepping up current/voltage via a turning on/off operation of a transistor, and thus, may include the boost inductor LIN, the first transistor M1, and the first output diode D1.

The boost inductor LIN may include an end connected to the input end VBAT to which a battery voltage is input, and the other end connected to an anode of the first output diode D1. The first transistor M1 may include a first electrode connected to the other end of the boost inductor LIN and a second electrode connected to a ground line BGND at the other side, and although not shown, may include a gate electrode connected to a first control signal line. The first output diode D1 may include an anode connected to the other end of the boost inductor LIN and the first electrode of the boost switch M1, and a cathode connected to the first driving voltage output end VDDEL.

In addition, the first boost circuit BCON may further include an input capacitor of the input end VBAT and an output capacitor of the first driving voltage output end VDDEL.

The second boost circuit BBCON may be embodied as a 2 phase buck-boost converter for discharging current/voltage and stepping down a turning on/off operation of a switch transistor, and thus, may include the second transistor M2, the second output diode D2, the phase controller PCON, the switch transistor SW, the first inductor L1, and the second inductor L2.

The second transistor M2 may include a first electrode connected to the input end VBAT to which a battery voltage is input, and a second electrode connected to the anode of the second output diode D2, and although not shown, may include a gate electrode connected to a second control signal line. The second output diode D2 may include an anode connected to the second electrode of the second transistor M2 and a cathode connected to the second driving voltage output end VSSEL.

The phase controller PCON may include a first input end connected to the correction signal input end VCS to which the correction signal VCS is input, a second input end connected to the current sensing line ISSEL for sensing current flowing through a second driving voltage line of the display panel, and an output end connected to a gate electrode of the switch transistor SW. The phase controller PCON may set a time point of turning on the switch transistor SW by sensing (referring to) the second driving current of the display panel. The phase controller PCON may output a switch control signal for controlling turn on/off of the switch transistor SW based on the correction signal VCS and the sensing current.

The switch transistor SW may include a first electrode connected to the second electrode of the second transistor M2, a second electrode connected to one end of the second inductor L2, and a gate electrode connected to the output end of the phase controller PCON. The first inductor L1 may include one end connected to the second electrode of the second transistor M2 and the other end connected to the ground line BGND at the other side. The second inductor L2 may include one end connected to the second electrode of the switch transistor SW and the other end connected to the ground line BGND at the other side.

The first correction circuit COMPs may compare a sensing voltage value obtained by monitoring (sensing) a battery voltage with an internal reference voltage value BGR and may then output the resulting value. To this end, the first correction circuit COMPs may include a first comparator U1, a second comparator U2, first and second resistors R1 and R2, and first and second comparison resistors Rcomp1 and Rcomp2. The first correction circuit COMPs may be embodied as a 2 phase comparator or the like in order to enhance sensing accuracy.

The first resistor R1 may include one end connected to the input end VBAT to which a battery voltage is input, and the other end connected to the first comparison resistor Rcomp1. The first comparison resistor Rcomp1 may include one end connected to a first input end IN of the first comparator U1, and the other end connected to a ground line AGND at one side.

The first comparator U1 may include the first input end IN connected to a connection node of the first resistor R1 and the first comparison resistor Rcomp1, a second input end REF connected to a reference voltage line (band gap reference (BGR)), and an output end connected to the first input end of the second correction circuit CONL. The first resistor R1 and the first comparison resistor Rcomp1 may be provided to set a battery voltage to be compared with the reference voltage value BGR by the first comparator U1. The first comparator U1 may output a first result value COM_OUT1 obtained via comparison between the reference voltage value BGR and a first partial voltage value IN1 (or a first sensing value) applied through a connection node of the first resistor R1 and the first comparison resistor Rcomp1.

The second resistor R2 may include one end connected to the input end VBAT to which a battery voltage is input, and the other end connected to the second comparison resistor Rcomp2. The second comparison resistor Rcomp2 may include one end connected to the first input end IN of the second comparator U2 and the other end connected to the ground line AGND at one side. The ground line AGND at one side and the ground line BGND at the other side may be commonly connected to each other or may be physically separated from each other.

The second comparator U2 may include the first input end IN connected to a connection node of the second resistor R2 and the second comparison resistor Rcomp2, the second input end REF connected to a reference voltage line (band gap reference (BGR)), and an output end connected to the second input end of the second correction circuit CONL.

The second resistor R2 and the second comparison resistor Rcomp2 may be provided to set a battery voltage to be compared with the reference voltage value BGR by the second comparator U2. The second comparator U2 may output a second result value COM_OUT2 obtained via comparison between the reference voltage value BGR and a second partial voltage value IN2 (or a second sensing value) applied through a connection node of the second resistor R2 and the second comparison resistor Rcomp2.

For example, when a relationship between the first sensing value IN1 and the reference voltage value BGR is IN1>BGR, the first result value COM_OUT1 of the first comparator U1 may indicate High. However, when a relationship between the first sensing value IN1 and the reference voltage value BGR is IN1<BGR, the first result value COM_OUT1 of the first comparator U1 may indicate Low.

When a relationship between the second sensing value IN2 and the reference voltage value BGR is IN2>BGR, the second result value COM_OUT2 of the second comparator U2 may indicate High. However, when a relationship between the second sensing value IN2 and the reference voltage value BGR is IN2<BGR, the second result value COM_OUT2 of the second comparator U2 may indicate Low.

For example, when a High/Low turning point of the first sensing value IN1 may be set to 4.2 V and a High/Low turning point of the second sensing value IN2 is 3.0 V, the register value REG may be set in the form of [0,0]: 3.0 V or less, [0,1]: 3.0 V to 4.2 V, and [1,1]: 4.2 V or greater. The reference voltage value BGR may be set to satisfy BGR=4.2V*[Rcomp1/(R1+Rcomp1)].

The second correction circuit CONL may provide the correction signal VCS based on the result values COMP_OUT1 and COMP_OUT2 output from the first comparator U1 and the second comparator U2, respectively, and the register value REG supplied from the outside. To this end, the second correction circuit CONL may include control logic such as a control circuit. The register value REG may be originally contained or may be received from a timing controller or a data driver.

The correction circuit 181 including the first correction circuit COMPs and the second correction circuit CONL may be referred to as an auto calibration circuit for automatically calibrating output efficiency of the boost circuit 185 based on a 2 phase comparator in real time. The correction circuit 181 and the boost circuit 185 included in the power supply 180 may be referred to as an auto efficiency calibration.

In order to overcome efficiency hump, the power supply 180 according to the sixth aspect may overcome or prevent efficiency hump based on a battery voltage and sensing current of a display panel. To this end, as shown in FIG. 9, the power supply 180 may turn off the switch transistor SW to allow only the first inductor L1 to participate in output, or as shown in FIG. 10, may turn on the switch transistor SW to allow both the first inductor L1 and the second inductor L2 to participate in output.

FIG. 11 is a diagram showing an example in which a correction circuit of a power supply is set to be operated when a battery voltage VBAT is 2.5 V. In the case of setting shown in FIG. 11, the correction circuit of the power supply may perform an operation (mA unit control) for enhancing the driving current ISSEL driven in 2 phases to a second period B from a first period A. In this case, the battery voltage VBAT is 2.5 V but output efficiency (power IC efficiency) of the power supply may be enhanced compared with the case in which the battery voltage VBAT is 3.85 V.

FIG. 12 is a diagram showing an example in which a correction circuit of a power supply is set to be operated when a battery voltage VBAT is 4.9 V. In the case of setting shown in FIG. 12, the correction circuit of the power supply may perform an operation (mA unit control) for lowering the driving current ISSEL driven in 2 phases to a third period C from the first period A. In this case, the battery voltage VBAT is 4.9 V but output efficiency (power IC efficiency) of the power supply may be lowered compared with the case in which the battery voltage VBAT is 3.85 V.

As seen from flows between FIGS. 11A and 11B and FIGS. 12C and 12A, the power supply 180 according to the sixth aspect may include a circuit for automatically compensating for output efficiency in response to change in voltage and current, thereby overcoming efficiency hump. It may be noted that, when efficiency hump occurs, efficiency is lowered as indicated by a bold line but not a dotted line.

The power supply 180 according to the sixth aspect may prevent change in output efficiency of the power supply depending on driving current when the power supply 180 is applied to a display device based on current driving. In order to express a high gray scale on a display panel, 2 phase driving current that selectively uses an inductor in specific driving current may be controlled, in which case output efficiency may be enhanced.

Needless to say, the power supply 180 according to the sixth aspect may perform optimization to prevent a point of achieving maximum efficiency depending on an input voltage from being varied (lowered), and even if a battery with the same capacitance is used, a display device may be driven for a relatively long time.

Figure 13:
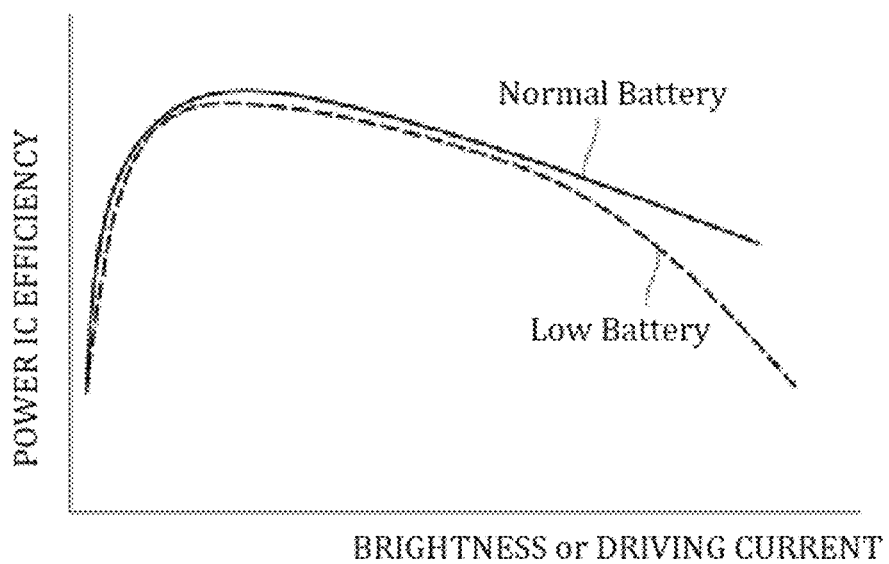
FIG. 13 is a graph of output efficiency of a power supply depending on a state of a battery voltage.
Figure 14:
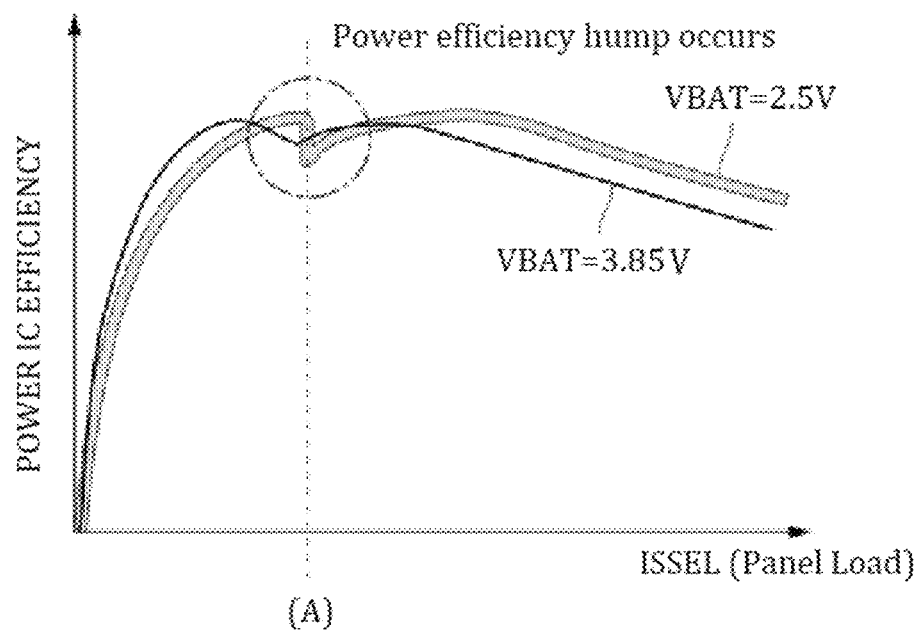
FIG. 14 is a graph for explaining an issue when a correction operation of a correction circuit is not used.

FIG. 13 is a graph of output efficiency of a power supply depending on a state of a battery voltage. FIG. 14 is a graph for explaining an issue when a correction operation of a correction circuit is not used.

As shown in FIG. 13, when a voltage of 4 V to 4.6 V needs to be generated in a low battery state in which a battery voltage is low, a voltage difference is high, and thus, a transistor or a switch of a power supply needs to be turned on for a longer time than in a normal battery state (e.g., 3.8 V).

However, as a time of turning on the transistor or the switch of the power supply is increased, power loss of the power supply may be increased, thereby lowering output efficiency. This point may cause a larger difference in output efficiency when brightness is high (or when driving current is high).

A difference in output efficiency of the power supply is present depending on state of a battery voltage, and thus, when a correction operation of a correction circuit is not used, efficiency hump (power efficiency hump) may occur as seen from point A of FIG. 14.

However, as described above with reference to FIGS. 11 and 12, the present disclosure may include a circuit for automatically correcting output efficiency in response to change in input voltage and load current, and thus, may perform optimization to overcome efficiency hump and to prevent a point for achieving maximum efficiency from being varied (lowered).

The present disclosure may overcome efficiency hump based on a circuit for automatically correcting output efficiency and may perform optimization to prevent a point for achieving maximum efficiency from being varied (lowered). In addition, according to the present disclosure, consumption power may be lowered by enhancing output efficiency and performing optimization, and even if a battery with the same capacitance is used, a display device may be driven for a relatively long time.

While the present disclosure has been described referring to the exemplary aspects of the present disclosure, those skilled in the art will appreciate that many modifications and changes can be made to the present disclosure without departing from the spirit and essential characteristics of the present disclosure. Thus, it would be understood that the aforementioned aspects are exemplary in all fields and are not limited. In addition, the scope of the disclosure should be determined by the appended claims. All modifications or changes derived from the meaning and scope of the claims and their equivalents are included in the scope of the present disclosure.

What is claimed is:

1. A display device comprising:
   a display panel configured to display an image;
   a driver configured to drive the display panel; and
   a power supply including a boost circuit that has a first boost circuit configured to output a first driving voltage to be supplied to the display panel by stepping up an input voltage and a second boost circuit configured to output a second driving voltage to be supplied to the display panel by stepping down the input voltage, and a correction circuit configured to output a correction signal based on a result obtained by sensing the input voltage,
   wherein the power supply controls output efficiency of the boost circuit based on the input voltage and current sensed from the display panel, and
   wherein the second boost circuit includes:
   a transistor configured to control the second driving voltage;
   a switch transistor configured to control the current to be supplied to the display panel;
   a first inductor disposed between the transistor and a ground line;
   a second inductor disposed between the switch transistor and the ground line; and
   a phase controller configured to control the switch transistor.

2. The display device of claim 1, wherein the power supply increases the current to be supplied to the display panel from a first period to a second period or decreases the current from the first period to a third period in order to control the output efficiency of the boost circuit.

3. The display device of claim 1, wherein the phase controller varies a turning-on/off time point of the switch transistor based on the correction signal and the current sensed from the display panel.

4. The display device of claim 3, wherein the correction circuit outputs the correction signal based on a register value output from a data driver configured to drive the display panel or a timing controller configured to control the data driver or a register value that is originally contained in the power supply.

5. The display device of claim 3, wherein the correction circuit includes:
   a first correction circuit configured to compare a sensing voltage value configured to sense the input voltage with an internal reference voltage value and to output a result value; and
   a second correction circuit configured to output the correction signal based on the result value output from the first correction circuit and a register value supplied from an outside or an inside.

6. The display device of claim 5, wherein the first correction circuit includes:
a first resistor having a first end connected to an input end to which the input voltage is applied; and
a first comparison resistor having a first end connected to a second end of the first resistor and a second end connected to the ground line; and a first comparator having a first input end connected to a connection of the first resistor and the first comparison resistor, a second input end connected to a reference voltage line, and an output end connected to a first input end of the second correction circuit.

7. The display device of claim 5, wherein the second correction circuit includes:
a second resistor having a first end connected to the input end to which the input voltage is applied;
a second comparison resistor having a first end connected to a second end of the second resistor and a second end connected to the ground line; and
a second comparator having a first input end connected to a connection node of the second resistor and the second comparison resistor, a second input end connected to the reference voltage line, and an output end connected to a second input end of the second correction circuit.

8. A power supply comprising:
a boost circuit including a first boost circuit configured to output a first driving voltage with a high potential by stepping up an input voltage, and a second boost circuit configured to output a second driving voltage with a low potential by stepping down the input voltage; and
a correction circuit configured to output a correction signal based on a result obtained by sensing the input voltage,
wherein output efficiency of the boost circuit is automatically controlled based on the input voltage and current sensed from a load, and
wherein the second boost circuit includes:
a transistor configured to control the second driving voltage;
a switch transistor configured to control the current to be supplied to the display panel;
a first inductor disposed between the transistor and a ground line;
a second inductor disposed between the switch transistor and the ground line; and a phase controller configured to control the switch transistor; and wherein the phase controller varies a turning-on/off time point of the switch transistor based on the correction signal and the current sensed from the display panel.

9. The power supply of claim 8, wherein the correction circuit includes:
a first correction circuit configured to compare a sensing voltage value configured to sense the input voltage with an internal reference voltage value and to output a result value; and
a second correction circuit configured to output the correction signal based on the result value output from the first correction circuit and a register value supplied from an outside or an inside.

10. The power supply of claim 9, wherein the first correction circuit includes:
a first resistor having a first end connected to an input end to which the input voltage is applied;
a first comparison resistor having a first end connected to a second end of the first resistor and a second end connected to the ground line; and
a first comparator having a first input end connected to a connection of the first resistor and the first comparison resistor, a second input end connected to a reference voltage line, and an output end connected to a first input end of the second correction circuit.

11. The power supply of claim 9, wherein the second correction circuit includes:
a second resistor having a first end connected to the input end to which the input voltage is applied;
a second comparison resistor having a first end connected to a second end of the second resistor and a second end connected to the ground line; and
a second comparator having a first input end connected to a connection node of the second resistor and the second comparison resistor, a second input end connected to the reference voltage line, and an output end connected to a second input end of the second correction circuit.

12. A power supply comprising:
a first boost circuit configured to output a first driving voltage with a high potential by stepping up an input voltage;
a second boost circuit configured to output a second driving voltage with a low potential by stepping down the input voltage; and
a first correction circuit configured to compare a sensing voltage value obtained by sensing the input voltage with an internal reference voltage value and to output a result value; and
a second correction circuit configured to output the correction signal based on the result value output from the first correction circuit and a register value,
wherein output efficiency of the first and second boost circuits is automatically controlled by the input voltage and current sensed from a load, and
wherein the second boost circuit includes:
a transistor configured to control the second driving voltage;
a switch transistor configured to control the current to be supplied to the display panel;
a first inductor disposed between the transistor and a ground line;
a second inductor disposed between the switch transistor and the ground line; and
a phase controller configured to control the switch transistor.

13. The power supply of claim 12, wherein the current from a first period to a second period is increased in order to control the output efficiency of the first and second boost circuits.

14. The power supply of claim 12, wherein the current from a first period to a third period is decreased in order to control the output efficiency of the first and second boost circuits.

15. The power supply of claim 12, wherein the phase controller varies a turning-on/off time point of the switch transistor based on the correction signal and the current sensed from the display panel.

* * * * *